(12) United States Patent
Schylander

(10) Patent No.: US 6,574,176 B1
(45) Date of Patent: Jun. 3, 2003

(54) RECORD CARRIER, METHOD OF RECORDING INFORMATION ON A RECORD CARRIER, RECORDING APPARATUS AND PLAYBACK DEVICE

(75) Inventor: Erik C. Schylander, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/318,326

(22) Filed: May 25, 1999

(30) Foreign Application Priority Data

May 26, 1998 (EP) .............................. 98201731

(51) Int. Cl.$^7$ ................................ G11B 5/09
(52) U.S. Cl. ................. 369/47.15; 369/53.2; 369/275.3
(58) Field of Search ................... 369/32, 33, 47.47, 369/47.15, 53.2, 53.24, 53.41, 124.07, 275.3, 32.01, 33.01

(56) References Cited

U.S. PATENT DOCUMENTS

| | | | |
|---|---|---|---|
| 4,999,825 A | | 3/1991 | Raaymakers et al. .... 369/44.26 |
| 5,060,219 A | | 10/1991 | Lokhoff et al. |
| 5,878,019 A | * | 3/1999 | Schylander et al. ...... 369/32 X |
| 6,219,043 B1 | * | 4/2001 | Yogeshwar et al. ......... 345/328 |
| 6,226,241 B1 | * | 5/2001 | D'Amato et al. ........ 369/47.15 |

FOREIGN PATENT DOCUMENTS

| | | |
|---|---|---|
| EP | 0265984 A1 | 5/1988 |
| EP | 0288114 A1 | 10/1988 |
| EP | 0397238 A1 | 11/1990 |
| EP | 0465245 A2 | 1/1992 |
| EP | 0507397 A2 | 10/1992 |
| EP | 0507403 A2 | 10/1992 |

* cited by examiner

Primary Examiner—Paul W. Huber
(74) Attorney, Agent, or Firm—Michael E. Belk

(57) ABSTRACT

An information volume is recorded in sectors of a track of a record carrier in compliance with the CD-ROM XA standard. The information volume includes data files, control information for controlling the search for information in the recorded information volume, and a file location table with file location entries containing an identification and an address of the data files. The file location table has a size of at most one sector. This method of recording enables a relatively simple microprocessor to retrieve the recorded information, while maintaining compatibility with the CD-ROM XA standard.

13 Claims, 2 Drawing Sheets

RECORD CARRIER, METHOD OF RECORDING INFORMATION ON A RECORD CARRIER, RECORDING APPARATUS AND PLAYBACK DEVICE

FIELD OF THE INVENTION

The invention relates to a record carrier on which an information volume is stored in tracks of the record carrier in compliance with a standard, which information volume comprises data files and control information intended to be used for controlling the search for information in the recorded information volume.

The invention also relates to a method of recording information on a record carrier, in which method an information volume is recorded in tracks of the record carrier in compliance with a standard, which information volume comprises data files and control information intended to be used for controlling the search for information in the recorded information volume.

The invention also relates to a recording apparatus for recording information comprising data files on a record carrier in compliance with a standard, which apparatus comprises recording means for recording information in tracks of the record carrier, formatting means for composing an information volume in accordance with predetermined formatting instructions, according to which instructions the information volume is provided with control information intended to be used for controlling the search for information in the information volume, and control means for causing the recording means to record the information volume.

The invention further relates to a playback device for reading the record carrier.

BACKGROUND OF THE INVENTION

Such a record carrier, method, recording apparatus and playback device are described in EP 507 403 A2 hereby incorporated herein in whole by reference. In the CD-ROM-XA system the so-called volume descriptor is recorded as control information in an address range beginning with the sector having the logic sector number 16. This volume descriptor comprises, for example, references to the sector address of the so-called path table which table comprises the directory structure and references to directory files. This path table and these directory files contain the necessary information for searching and reading the data files included in the recorded information volume. More than one volume may be recorded on the record carrier. In that case the last recorded volume contains control information which is intended to be used for controlling the search for information in the relevant information volume and in previously recorded information volumes. The standardized format in which the information is recorded on the record carrier makes it comply with a plurality of operating systems.

It is however a disadvantage that retrieval of the information of the record carrier requires a relatively complex CPU with external memory.

SUMMARY OF THE INVENTION

It is an object of the invention to provide means which obviate this disadvantage, but which still are compatible with a standard.

With respect to the record carrier this object is achieved in that the information volume in addition comprises a File Location Table with File Location Entries containing an identification and an address of the data files.

With respect to the method this object is achieved in that the information volume in addition comprises a File Location Table with File Location Entries containing an identification and an address of the data files.

With respect to the recording apparatus this object is achieved in that the apparatus comprises deriving means for deriving a File Location Table with File Location Entries which contain an identification and an address of the data files and in that the control means are arranged for causing the file location table to be recorded in addition to the other information.

The record carrier of the invention is suitable for playback on a playback device having a relatively simple processor, which is arranged for processing the File Location Table. The File Location Table on the one hand is compact so that a simple processor suffices, while on the other hand it allows the processor to discriminate between and locate files of different types. Moreover, the record carrier is fully compatible with the said standard, preferably the ISO-9660 standard, the latter being widely used by for example CD-ROM XA, CD-I, CD-ROM, PHOTO-CD and SVCD. The record carrier of the invention therefore, can be read by a wide range of playback devices.

It is remarked that EP 507 397 hereby incorporated herein in whole by reference discloses a method of recording information volumes on a record carrier wherein the lead out sector comprises a table of contents (TOC) of the files recorded on the record carrier. A TOC is suitable for controlling playback of files of the same type, e.g. files containing digitized picture information. The TOC can however not be used for playback of a record carrier containing different filetypes, because a file identification for identifying the type of file is lacking.

It is further remarked that EP 465 245 hereby incorporated herein in whole by reference discloses a record carrier for Karaoke music. Data structures are proposed to enable a playback device to start playback of music and its wordings at an arbitrary point in time. It is not suggested to combine datastructures at the same record carrier so as to enable playback by different type of playback devices.

The File Location Table may contain other information in addition to that specified above, such as an entry containing the size of the file location entries. The File Location Table however, should be compact as compared to the control information compliant with the standard. In a preferred embodiment, wherein the information volume is divided in sectors, the File Location Table has a size of at most one sector.

BRIEF DESCRIPTION OF THE DRAWINGS

These and other aspects of the present invention are discussed in more detail with reference to the drawing.

DETAILED DESCRIPTION OF THE PREFERRED EMBODIMENT

Figure 1:
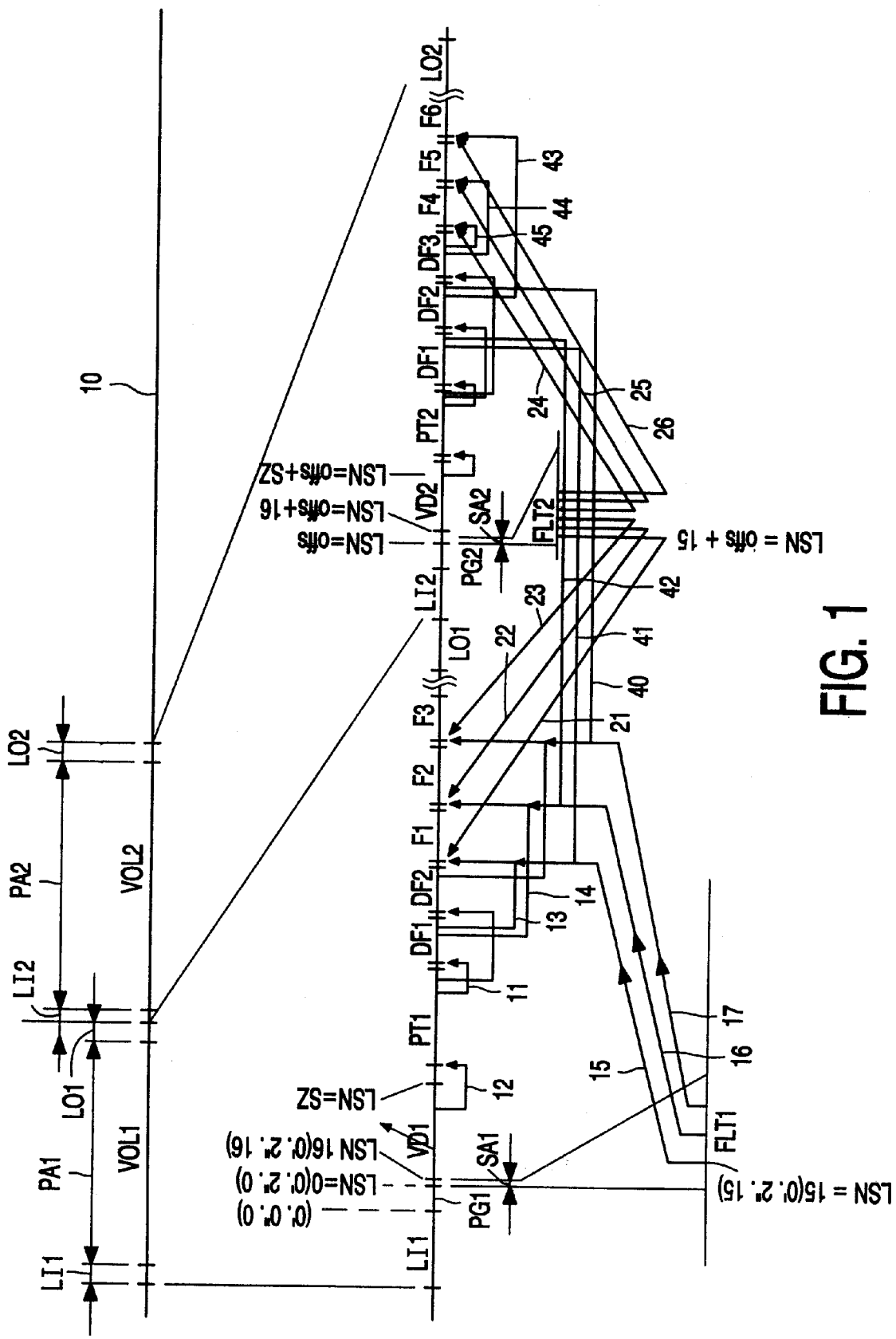
FIG. 1 diagrammatically shows the layout of a track of a record carrier according to the invention, FIG. 2 diagrammatically shows an embodiment of a recording apparatus.

FIG. 1 diagrammatically shows the layout of a track 10 of a record carrier according to the invention. The record carrier is an optically readable disc on which information is recorded according to the CD-ROM XA standard. Main information recorded in the form of one or more information volumes comprises data files and control information intended to be used for controlling the search for information in the recorded information volume. Additionally information recorded on the disc comprises sub-code information. The sub-code information is subdivided into subcode frames. The main information is subdivided in so-called sectors having a length corresponding to that of a sub-code frame of the sub-code information. The track 10 comprises a so-called lead-in referenced LI1, a program area referenced PA1 and a lead-out referenced LO1. The combination consisting of the lead-in LI1, the program area PA1 and the lead-out LO1 will henceforth be denoted information volume. The program area PA1 is intended for storing user information. The information in the program area PA1 is subdivided into so-called sectors having a length corresponding to that of a sub-code frame. Each of the sub-code frames in the program area PA1 comprises an absolute time code denoting the position at which the sub-code frame concerned is recorded relative to the beginning of a program area PA1. The sectors also have absolute time codes corresponding to the absolute time code in the sub-code frame recorded together with the sector. The program area PA1 comprises a so-called pregap referenced PG1 in which no main information is recorded and which can be used for synchronizing the readout. The pregap PG1 extends over a length referenced by the absolute time codes 0'.0".0 to 0'.2".0. The pregap is followed by a so-called system area reserved for use by the system. The system area extending from 0'.2".0 to 0'.2".16 is referenced by the letters SA1. This system area SA1 is followed by a so-called volume descriptor referenced VD1 commencing at 0'.2".16 on each CD-ROM disc. The length of the volume descriptor VD1 is not fixed but depends on the selected use of the CD-ROM. The volume descriptor VD1, however, does comprise information about its length and is furthermore terminated by a code pattern denoting the end of the volume descriptor VD1. The program area PA1 further includes a so-called path table referenced PT1, one or more so-called directory files referenced DF1, DF2 and data files referenced F1, F2, F3. The path table PT1 comprises information about the directory structure of the information stored on the disc. The path table further includes references to sector addresses of the directory files DF1, DF2. In FIG. 1 the reference to the initial address of the directory file DF1 is denoted by line 11. The volume descriptor VD1 comprises a reference denoted by line 12 to the address of the sector in which the path table PT1 is stored. The directory files comprise information about the structure of the data files stored in the directory concerned and references denoted by the lines 13 and 14 to the addresses of the sectors in which the user files of the directory concerned are stored. The path table and directory file comprise the control information necessary for searching for the data files F1, . . . , F3.

According to the invention the information volume VOL1 in addition comprises a File Location Table FLT1 with File Location Entries which contain an address (indicated by arrows 15, 16, 17 respectively) and identification of each of the data files F1, F2, F3. The File Location commences at absolute time code 0'.2".15 and ends at 0'.2".16.

Analogously the record carrier contains a further information volume VOL2 with a further volume descriptor VD2, further path table PT2, further directory files DF3, DF4, and further user files F4, F5, F6. Analogously a further File Location Table FLT2 is located here in the sector of the further information volume VOL2 having logical sector number 'offs+15'. This File Location Table contains File Location Entries with an address indicated by arrows 21, . . . , 26 and an identification of each of the data files F1, . . . , F6.

An embodiment of the File Location Table is shown in more detail below. The File Location Table comprises File Location Entries and a header with general information. In the embodiment shown the header contains the following entries.

A System Identification which enables a system to identify the table, as well as a Specification Version Number of the specification. This allows for future amendments. The system identification and the specification version number facilitate playback-devices to recognize the record-carrier.

In the present embodiment the header of the table further comprises the entry Number of Files.

In the present embodiment the File Location Entries are stored at locations which are spaced at a regularly distance. The distance between succeeding locations is equal to the size of the File Location Entries and is stored as an entry Entry Size in the File Location Table.

The space required for a File Location Entry depends on whether other information is stored in these entries apart from the file identification and the address of the files. As playback systems can read the size of the entries from Entry Size, it is possible on the one hand to add such additional information if so desired, while on the other hand it is not necessary to reserve space therefore. This makes it possible to make a trade-off between the Entry Size and the Number of Files represented in the File Location Table.

| File Location Table | |
|---|---|
| Syntax | Size (# bytes) |
| System Identification | 8 |
| Specification Version Number | 2 |
| Number of Files | 2 |
| Entry Size | 1 |
| Reserved Byte | 1 |
| File Location Entry 1 | Entry Size |
| File Location Entry 2 | Entry Size |
| File Location Entry n | Entry Size |
| Reserved Byte(s) | until end of sector |

An embodiment of a File Location Entry is shown in the table below.

| File Location Entry | |
|---|---|
| Syntax | Size (# bytes) |
| File identification | 1 |
| File address | 3 |

In the embodiment shown, the File Location Entries comprise apart from the File address a File identification. The File address enables the system to directly retrieve the file. The File address is specified here as mm:ss:ff. Otherwise the File address can be specified as a logical sector number (LSN), wherein LSN=(((MIN*60)+SEC)*75+FR) for the absolute time code MIN'.SEC".FR.

In the present embodiment the Entry Size is equal to the distance at which the File Location Entries are spaced and amounts to 4 bytes.

The File identification contains a unique code for each of the data-files and additionally contains information about the type of file, such as MPEG files for audio/visual sequences, a file containing a Play Sequence Descriptor for controlling reproduction of the user data, a file containing information about karaoke recordings etc. The File identification facilitates a playback device to recognise the file.

A value n of the entry File identification from 1 to 99 represents the $n^{th}$ audio/visual data file in MPEG format present on the record carrier. Values of 100 and higher identify other filetypes. For example, 100 is the file identification of the KARINFO.BIH file which contains references to karaoke information.

Figure 2:
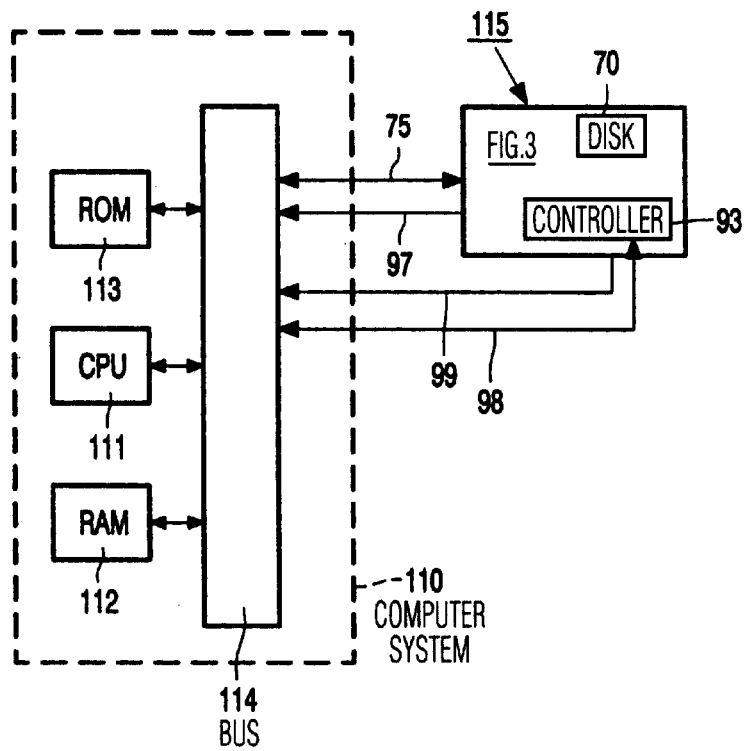

FIG. 2 diagrammatically shows an embodiment for a recording apparatus according to the invention. The recording apparatus comprises a computer system 110 of a customary type, with a central processor 111, a RAM 112 and a ROM 113. The central processor 111, the RAM 112 and the ROM 113 are connected to a system bus 114 for mutual data transport. The recording apparatus further includes a write unit 115 for writing information on a disc 70, for example, of a write-once type. The write unit 115 is connected to the system bus 114 over data signal paths 75 and 97 for receiving information to be recorded and supplying information that has been read out. The write unit 115 comprises a control unit 93 for controlling the writing operation. The control unit is connected to the system bus 114 over the control signal paths 98 and 99 for the exchange of control commands and control data between the control unit 93 and the computer system 110.

Figure 3:
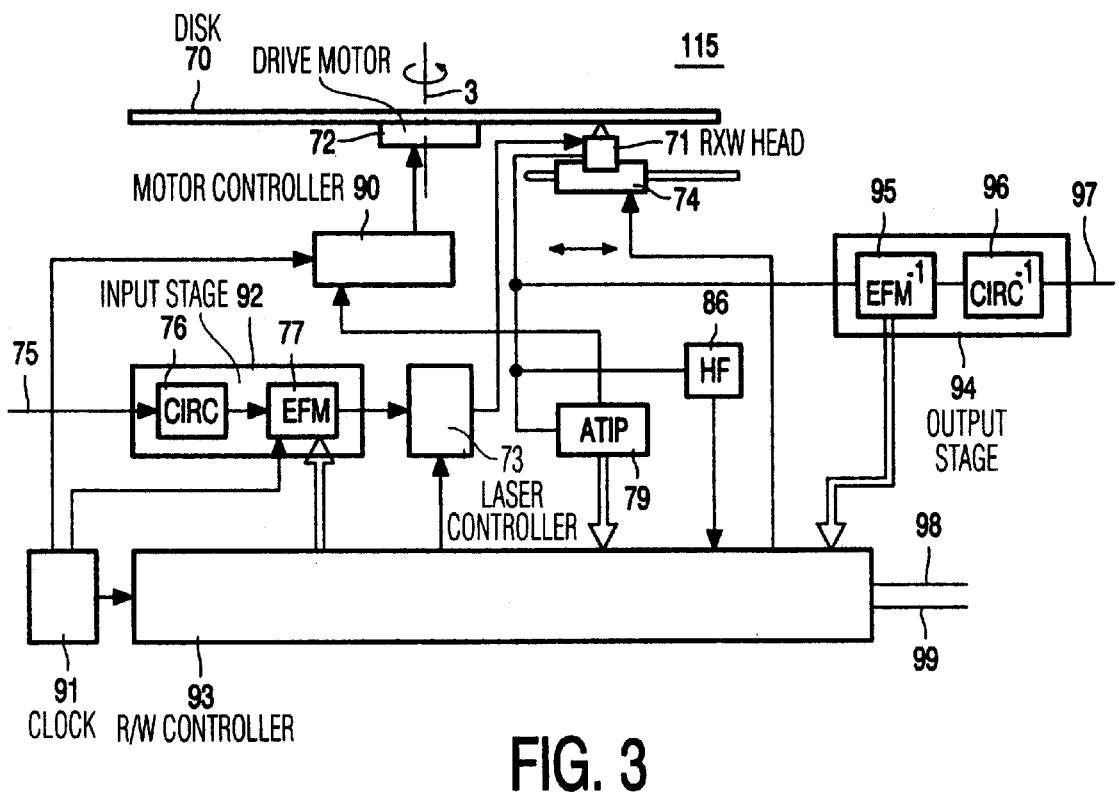
FIG. 3 shows a part of said embodiment in more detail.

FIG. 3 shows an embodiment for the write unit 115 suitable for recording CD signals such as, for example, CD-I, CD-ROM, CD-ROM XA, PHOTO-CD and HQ-VCD signals. In this Figure reference numeral 70 denotes a record carrier, for example a CD-WO-type record carrier of the optical write-once type. Such a record carrier is described in detail in patent(application)s EP 265 984 A1, U.S. Pat. Nos. 4,999,825, 5,060,219 and EP 397 238 A1 which patent (application)s are hereby included in this description in whole by way of reference.

The record carrier described in these Applications comprises a helical track displaying a periodic track modulation, whose frequency is modulated in accordance with a position information signal in the form of an absolute time code signal.

The write unit 115 shown in FIG. 3 comprises a drive motor 72 for moving the record carrier 70 around an axis 3 in a rotating fashion. An optical read/write head 71 of a customary type is disposed opposite the rotating record carrier 70. The optical read/write head 71 is movable in radial direction by means of a radial displacing unit 74 which comprises, for example, a linear motor or spindle gearing. Information formatted according to the CD-ROM XA format is supplied over the data signal path 75. The CD-ROM XA format is described, for example, in the ISO-9660 standard. In addition to this information, data representing the File Location Table is supplied over the data signal path 75. The information supplied over the data signal path 75 is applied to an input stage 92 which rearranges the received information with the aid of a customary CIRC encoder 76 and adds redundant information for error correction purposes and then converts the information by means of a customary EFM modulator 77 into an EFM modulated signal. The EFM modulated signal is applied to a laser control circuit 73 which transforms the EFM modulated signal into a suitable control signal for a write laser used in the read/write head 71.

A suitable embodiment for such a control circuit 73 is disclosed in detail in Patent Application EP 288 114 A1, which is thereby included in whole in the description by way of reference. An output stage 94 is inserted between an output of the read/write head 71 and a data signal path 97 for the purpose of recovering information and supplying information that has been read out. For information recovery the output stage comprises an EFM demodulator 95 and a CIRC decoder 96 customary for this information. An ATIP detector 79 of a customary type, described in afore-mentioned patent U.S. Pat. No. 4,999,825, hereby incorporated herein in whole by reference is coupled to an output of the read/write head 71. Such an ATIP detector 79 recovers from detection signals produced by the read/write head the absolute time code represented by the FM modulated track modulation in the detected part of the track. Furthermore, the ATIP detector 79 produces a velocity signal having a frequency corresponding to the velocity with which the record carrier 70 is detected by the read/write head 71. This velocity signal is applied to a motor control circuit 90 to which, furthermore, a clock signal having a reference frequency is applied by a clock generator 91. The motor control circuit 90 is of a customary type controlling the motor drive 72 in such a way that the frequency of the velocity signal is substantially maintained equal to the frequency of the reference clock signal. Such a motor control circuit 90 may consist of, for example, a so-called PLL-motor velocity control circuit by which the motor is driven in response to the phase difference between the velocity signal and the reference clock signal.

The arrangement shown in FIG. 3 further includes a detection circuit 96 for detecting a high-frequency signal component in a signal that has been read out by the read/ write head 71 when the beginning of the still unrecorded track portion is searched for.

For the purpose of synchronization in the supply of the EFM modulated signal by the input stage 92, outputs of the clock signal generator 91 are also coupled to clock inputs of the CIRC encoder 76 and EFM modulator 77. Finally, the arrangement shown in FIG. 3 comprises a control unit 93 for controlling the recording and reading operations. For supplying sub-code information to the EFM modulator 77, the control unit 93 is coupled to sub-code inputs of the EFM modulator 77. The write unit 115 further includes a signal processing circuit for recovering the main information and sub-code information from the read signal produced by the read/write head 71. For receiving sub-code information from the read signal, the control unit 93 is coupled to sub-code outputs of the EFM demodulator 95. The control unit is further coupled to outputs of the ATIP decoder 79 for the benefit of the absolute time codes produced by the ATIP decoder 79. The control unit 93 is coupled to the radial displacing unit 74 for controlling the radial displacement of the read-write head. Furthermore, the control unit 93 is coupled to the control circuit 73 for setting the apparatus to the read or write mode.

In the read mode the control unit is arranged for processing the File Location Table. This enables the control unit to discriminate between and locate files of different types, such as MPEG-files containing audio/visual information, a file containing a Play Sequence Descriptor for controlling reproduction of user data, a file containing information about karaoke recordings etc.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims:

What is claimed is:

1. A record carrier, comprising:
    a substrate with tracks; and
    an information volume stored in the tracks in compliance with a standard, which information volume includes:
        directory files;
        data files not comprising the directory files;
        a path table, the path table and the directory files comprising control information for searching the data files; and
        a file location table with file location entries containing an identification and an address of the data files, wherein the information volume is divided in sectors, the file location table having a size of at most one sector.

2. The carrier of claim 1, in which the standard is the ISO-9660 standard.

3. The carrier of claim 1, which the identification is selected from a first and a second range of values, wherein a value in the first range represents a specific one of a series of a first type of file and the values in the second range represent other file types.

4. The carrier of claim 1, in which:
    the identification of the data files includes a file type;
    the standard is the ISO-9660 standard;
    the identification is selected from a first and a second range of values, wherein a value in the first range represents a specific one of a series of a first type of file and the values in the second range represent other file types; and
    the distance between two succeeding file location entries is stored in an entry of the file location table.

5. The carrier of claim 1, in which the identification of the data files includes a file type.

6. A method comprising the steps of:
    providing a record carrier with tracks;
    recording files and tables in an information volume in the tracks of the record carrier in compliance with a standard, said files and tables comprising:
        directory files;
        data files not comprising the directory files;
        a path table, the path table and the directory files comprising control information for searching the data files; and
    a file location table with file location entries containing an identification and an address of the data files.

7. The method of claim 6, in which:
    the identification of the data files includes a file type;
    the information volume is divided in sectors, the file location table having a size of at most one sector;
    the standard is the ISO-9660 standard;
    the identification is selected from a first and a second range of values, wherein a value in the first range represents a specific one of a series of a first type of file and the values in the second range represent other file types; and
    the file location entries are stored at locations which are spaced at mutually equal distances, wherein the distance between two succeeding file location entries is stored in an entry of the file location table.

8. Recording apparatus comprising:
    means for receiving information including data files to be recorded on a record carrier, said data files not comprising directory files;
    recording means for recording the information in tracks of the record carrier;
    formatting means for composing an information volume in accordance with predetermined formatting instructions, in compliance with a standard, according to which instructions the information volume is provided with control information intended to be used for controlling the search for information in the information volume;
    control means for causing the recording means to record the information volume; and
    deriving means for deriving a file location table with file location entries which contain an identification of the data files;
    and in which the control means are for causing the file location table to be recorded in addition to the other information.

9. The recording apparatus of claim 8, in which;
    the identification of the data files includes a file type;
    the information volume is divided in sectors, the file location table having a size of at most one sector;
    the standard is the ISO-9660 standard;
    the identification is selected from a first and a second range of values, wherein a value in the first range represents a specific one of a series of a first type of file and the values in the second range represent other file types; and
    the file location entries are stored at locations which are spaced at mutually equal distances, wherein the distance between two succeeding file location entries is stored in an entry of the file location table.

10. A playback device for reading a record carrier, said playback device comprising a processor arranged for processing a file location table of the record carrier, said record carrier comprising:
    a substrate with tracks; and
    an information volume stored in the tracks in compliance with a standard, which information volume includes:
        directory files;
        data files not comprising the directory files;
        a path table, the path table and the directory files comprising control information for searching the data files; and
        the file location table with file location entries containing an identification and an address of the data files.

11. The playback device of claim 10, further comprising:
    reading means for reading the data files and the control information from the information volume and for also reading the file location table entries; and
    searching means to search for the data files to be read depending on the control information and on the file location table.

12. The reader of claim 11, in which:
    the information volume is divided in sectors, the file location table having a size of at most one sector;
    the standard is the ISO-9660 standard;
    the identification is selected from a first and a second range of values, wherein a value in the first range represents a specific one of a series of a first type of file and the values in the second range represent other file types; and the file location entries are stored at locations which are spaced at mutually equal distances, wherein the distance between two succeeding file location entries is stored in an entry of the file location table.

13. A record carrier, comprising:

a substrate with tracks; and an information volume stored in the tracks in compliance with a standard, which information volume includes:
  directory files;
  data files not comprising the directory files;
  a path table, the path table and the directory files comprising control information for searching the data files; and
  a file location table with file location entries containing an identification and an address of the data files, wherein the distance between two succeeding file location entries is stored in an entry of the file location table.

* * * * *